United States Patent [19]

Sommer

[11] 4,185,512

[45] Jan. 29, 1980

[54] DOOR STOP FOR USE WITH AUTOMATIC DOOR OPERATORS

[75] Inventor: Gerhard B. Sommer, Algonquin, Ill.

[73] Assignee: Republic Industries, Inc., Chicago, Ill.

[21] Appl. No.: 903,895

[22] Filed: May 8, 1978

[51] Int. Cl.$^2$ .............................................. F16H 57/10

[52] U.S. Cl. ...................................... 74/411.5; 49/139; 49/326; 74/526

[58] Field of Search ..................... 74/411.5, 526, 10.2, 74/148, 149; 49/326, 137, 139

[56] References Cited

U.S. PATENT DOCUMENTS

| | | | |
|---|---|---|---|
| 2,293,299 | 8/1942 | Mastney et al. | 74/10.2 |
| 2,391,956 | 1/1946 | Eastman | 74/526 |
| 2,716,896 | 9/1955 | Beldt et al. | 74/10.2 |
| 2,744,416 | 5/1956 | Feigin | 74/10.2 |
| 2,844,038 | 7/1958 | Danta | 74/526 X |
| 3,203,262 | 8/1965 | Beer | 74/526 X |
| 3,662,610 | 5/1972 | Thoen | 74/10.2 |

FOREIGN PATENT DOCUMENTS

| | | | |
|---|---|---|---|
| 484740 | 11/1975 | Australia | 74/411.5 |

*Primary Examiner*—C. J. Husar

*Assistant Examiner*—Conrad Berman

*Attorney, Agent, or Firm*—McCaleb, Lucas & Brugman

[57] ABSTRACT

An electro-mechanical automatic door operator employing a motorized drive train including a pair of over-lapping gears closely confined within a header mounted housing of limited dimension and having a compact disc spring stop assembly carried by and movable with one of the over-lapping gears for engagement with the periphery of the other gear whereby to limit relative rotational movement of said gears and provide a yieldable stop of high impact capacity for protecting the drive train and an associated door from overload opening forces.

7 Claims, 7 Drawing Figures

DOOR STOP FOR USE WITH AUTOMATIC DOOR OPERATORS

BACKGROUND OF THE INVENTION

The utilization of automatic door controls and operator mechanisms for regulating the opening and closing movements of doors in commercial buildings, such as supermarkets, banks, department stores and the like, is a familiar part of the American scene. Normally, such automatic door operators are actuated by a mat switch or other suitable control, responsive to the passage of human traffic. Automatic door operators of this type may embody hydraulic, pneumatic or electro-mechanical systems for supplying the necessary door opening and closing forces. In employing electro-mechanical operators, which normally embody a drive-motor and mechanical drive train, it is particularly essential that the drive mechanism be protected against overload forces, such as may occur in the fully open position of an associated door, by reason of heavy wind loads or by the accidental or intentional application of manual forces on the door.

In the past, a variety of hydraulic or pneumatic devices have been used, such as hydraulic dash-pots and check devices, for avoiding impact against a rigid stop in the opening cycle of an associated door; such devices being particularly prevalent in known hydraulic and pneumatic door operators. In still other instances, externally attached hydraulic and rigid or resilient mechanical stops engageably by the door have been employed. However, such prior devices are objectionable not only from an esthetic standpoint, particularly if mounted in non-concealed positions, but for various operating reasons. For example, hydraulic door stops are subject to leakage problems, particularly when light oils or fluids are employed and if heavier fluids, such as grease are used, troublesome blockage of ports and passageways may occur. Further such fluid-operated devices have a relatively long recuperation time as compared to mechanical cushioning devices such as wall or floor mounted compression spring or rubber bumper mechanisms and the like. In addition to the above problems, commercial code requirements demand that inwardly opening doors, operated by automatic control devices, be equipped with a break-away stop feature so that they may be swung outwardly in reverse to their normal opening direction, for emergency exit operation.

Recognizing the foregoing factors, the provision of an effective stop mechanism for use with a motorized door operator of the electro-mechanical class has demonstrated that previously known stop devices, either fluid operated or mechanical, are too large and cumbersome for concealed installations or are otherwise prone to one or more of the aforementioned operational difficulties, thereby rendering them unsuitable for a high-impact resistant, compact stop capable of satisfying the esthetic and operational requirements of a header or under-the-floor installed automatic operator.

SUMMARY OF THE INVENTION

In general, this invention relates to automatic door operators and more particularly to an improved stop assembly for use with electro-mechanical door operator mechanisms.

In brief, the improved stop assembly of this invention is directed to a highly compact assembly employing a plurality of disc-type springs confined within a housing and cooperable with a plunger; the assembly being fixed to one of a pair of adjacently disposed rotatable gears in the drive train of an automatic electro-mechanical door operating mechanism. The involved gears are disposed in overlapping relationship and the stop assembly of this invention is engageable with the periphery of one of the gears in response to partial rotation of the other whereby to limit their relative rotation and limit door opening operation. The disc-springs are capable of producing impact resistance of a relatively high value and of sufficient magnitude to protect the mechanical drive train from expected overload forces. Adaptation of the disc-spring concept for the door stop permits an extremely compact stop device capable of being mounted within the limited confines of a header mounted or under-the-floor mounted housing for the operator mechanism, thereby satisfying desired esthetic requirements while avoiding operational defects prevalent with heretofore known hydraulic or pneumatic door stops.

It is a principal object in this invention to provide an improved door-stop productive of high load resistance values to protect mechanical drive trains in an atomatic door operator.

It is still another object of this invention provide an improved door stop, of the order set out in the immediately preceeding objective, which is highly compact and capable of operation within a housing for the mechanical drive train of the door operator.

A further object of this invention is to provide a stop assembly for automatic door operators which is capable of being utilized under break-away stop conditions.

A still further object of this invention is to provide a simplified door stop assembly of improved impact resistance characteristics, employing a plurality of confined disc-springs.

Having thus described this invention, the above and further objects, features and advantages thereof will appear from time to time from the following detailed description of a preferred embodiment thereof illustrated in the accompanying drawings.

DETAILED DESCRIPTION

Figure 1:
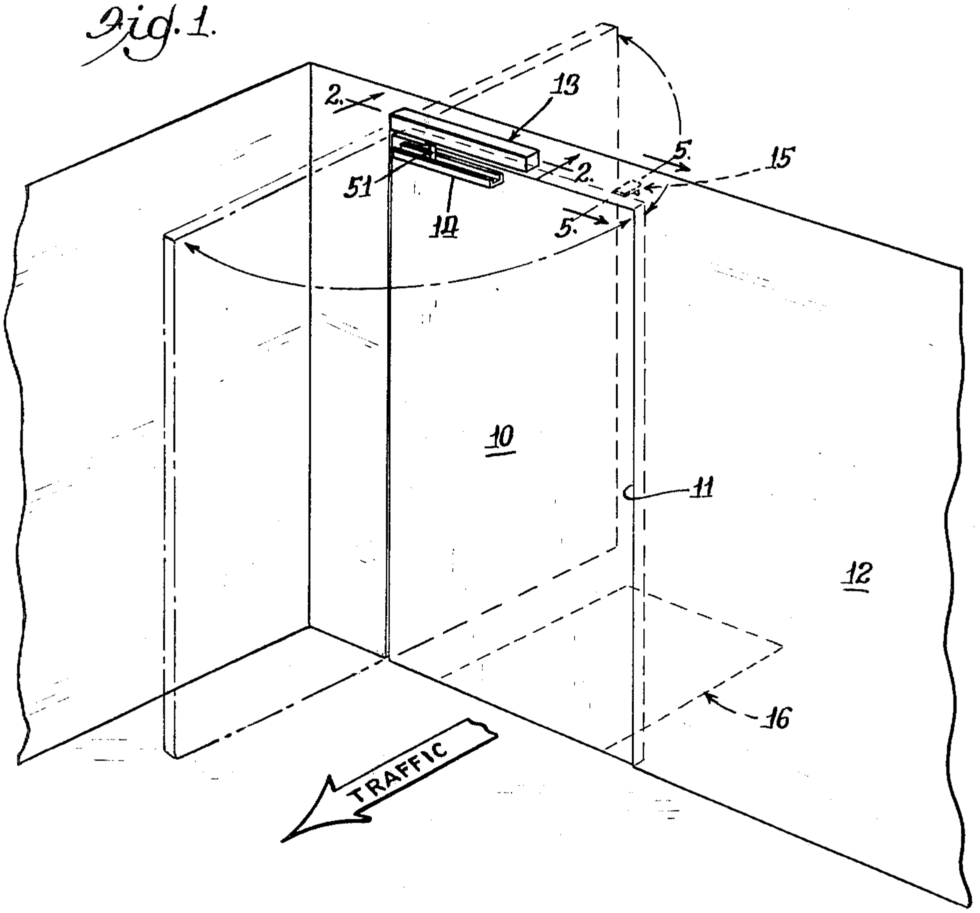
FIG. 1 is a perspective showing of a typical automatic door installation illustrative of the operational environment for the current invention.

Turning now to the features of the preferred embodiment of this invention, shown in the drawings, initial reference is made to FIG. 1, illustrative of a power operated door installation of the order to which this invention pertains.

As there shown, a door 10 is hinge or pivot mounted for semi-rotational movement about a vertical axis in a doorway opening 11 formed in a vertical wall or partition 12. An automatic power driven door operator assembly 13 preferably is concealed in the doorway frame header, and is coupled to the upper end of the door by an actuator arm and slide assembly 14 of known construction.

Door 10 normally opens inwardly or swings to the left as shown in FIG. 1, with its closed position across the doorway 11 being limited by a break-away stop assembly 15 mounted on the frame header. In emergency conditions, application of sufficient force on the closed door and stop assembly 15 causes the latter to release the door so that it may open outwardly, as indicated.

While the particular installation herein shown for the sake of descriptive purposes depicts a recessed header mounted door operator, it will be understood that assembly 13 also may be surface mounted or concealed in the floor beneath the door as dictated by convenience. In addition, a mat switch 16 or other cycle initiating device normally is employed with the operator to actuate the same in response to pedestrian traffic.

Figure 2:
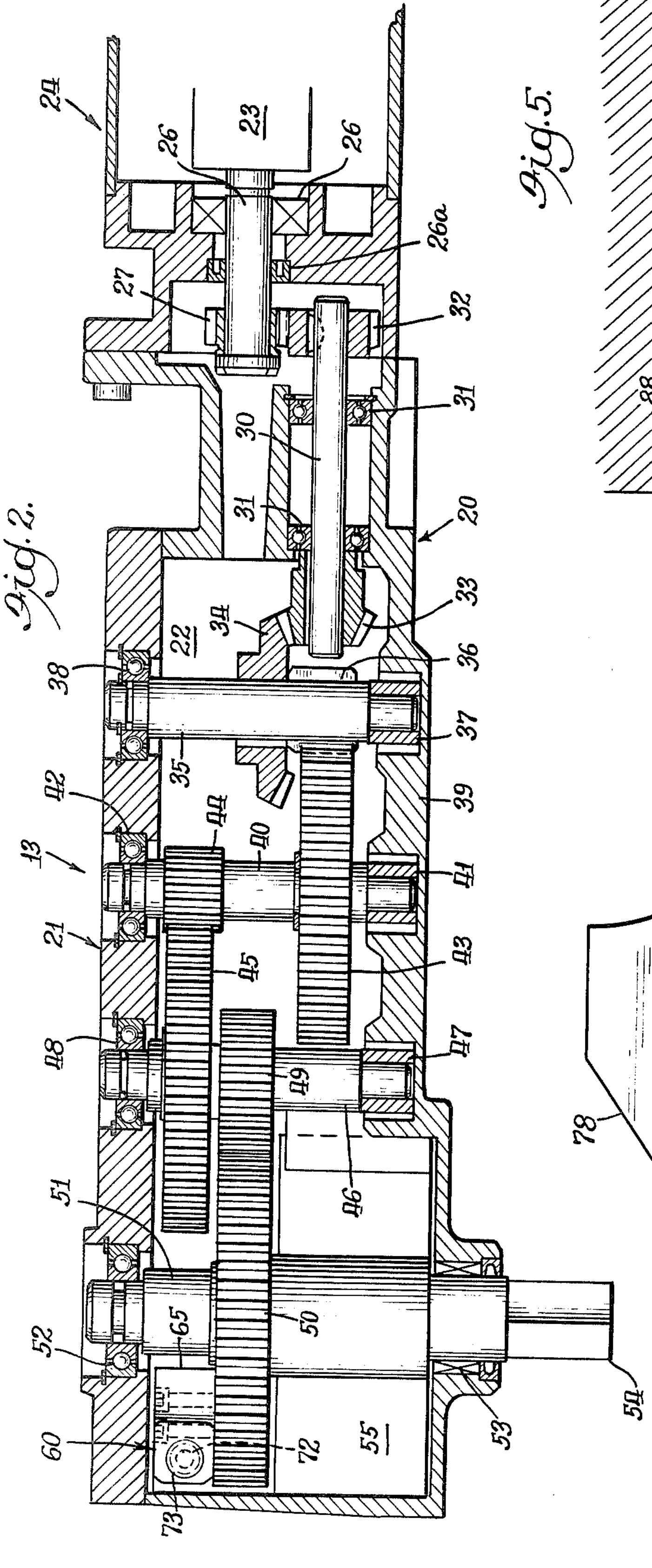
FIG. 2 is a longitudinal cross-sectional view, taken substantially along vantage line 2—2 of FIG. 1 and illustrating a electro-mechanical drive train useful with this invention.
Figure 5:
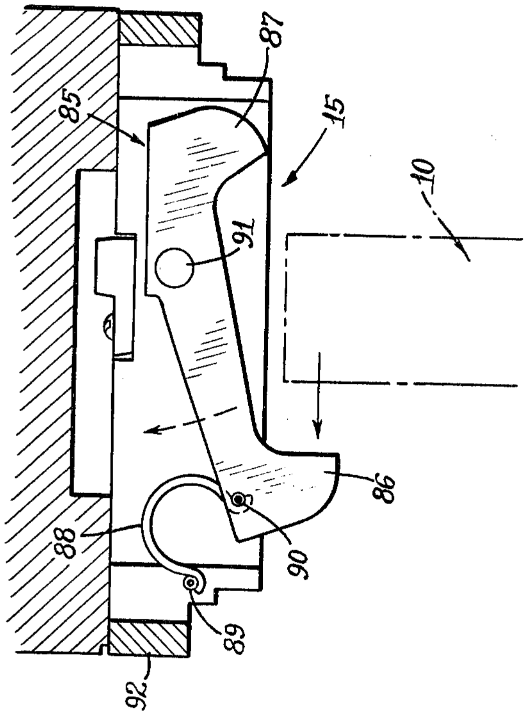
FIG. 5 is a sectional view taken substantially at vantage line 5—5 of FIG. 1, showing the features of a break-away stop mechanism employed in the door installation of FIG. 1.

As best shown in FIG. 2, the illustrated operator assembly 13 is electro-mechanical, embodying a mechanical drive train and an electrical drive motor for actuating the same. Briefly, assembly 13 comprises a cast metal gear housing 20, preferably of light weight metal such as aluminum, which is dimensioned to fit within a suitable recess provided therefor in the door frame header, as previously noted. Housing 20 generally is rectangular in shape and carries a removable top cover 21, having sealed connection therewith, for enclosing an internal gear chamber 22.

A drive motor 23, supported within a separate motor housing 24, is fixed to one end of the gear housing 20 and includes means for connection with suitable electrical supply and control conductors (not shown). A motor drive shaft 25 is supported in bearings 26 and 26a carried at one end of the motor housing; the shaft protruding outwardly therefrom for supporting a drive gear 27 in driving connection with a mechanical drive train supported within gear housing 20.

The drive train includes a pinion shaft 30, supported in spaced bearings 31, 31 so as to lie parallel to drive shaft 25. Shaft 30 carries a driven pinion gear 32 at one end for driving engagement with the motor driven drive gear 27 while a bevel pinion 33 is mounted on the opposite end of shaft 30 for rotation therewith. Bevel pinion 33 meshes with a larger bevel gear 34 rotatable with a first gear shaft 35; the latter being aligned at right angles to the axis of pinion shaft 30. Shaft 35 has an integral helical gear section 36 formed adjacently beneath the bevel gear 34 and is rotatably supported near its ends by bearing assemblies 37 and 38, respectively mounted in the bottom wall 39 of the gear housing and in the top cover 21.

Paralleling shaft 35 is a second gear shaft 40 supported at its opposite ends in bearing assemblies 41 and 42, in the same manner as shaft 35. A large helical gear

43 is keyed to gear shaft 40 in meshing engagement with the helical gear section 36 on shaft 35. Like shaft 35, the second gear shaft 40, also has a helical gear 43 (near its upper end) for driving engagement with a second large helical gear 45 having keyed connection with a third gear shaft 46, parallel to shafts 35 and 40.

This third gear shaft, like the two previously described gear shafts 35 and 40, is supported adjacent its opposite ends in bearing assemblies 47 and 48, respectively carried in the bottom wall 39 of housing 20 and the top cover 21 therefor. Also like such two shafts 35 and 40, the third gear shaft has an integral gear section 49, located adjacently beneath its associated helical gear 45, mounted immediately below the cover 21 near the upper end of shaft 46.

Gear section 49 is operatively positioned about midlength of shaft 46 and engaged with an adjacent large spindle gear 50, keyed to an operationally vertical door spindle shaft 51 rotatably supported in spaced bearing assemblies 52 and 53. Assembly 52 is carried by cover 21 while bearing assembly 53 is supported in the bottom wall 39 of the housing 20. It will be noted that the door spindle shaft 51 extends outwardly or beneath the housing bottom wall 39 and has its lower end 54 formed with intersecting planar faces for connective engagement with the operator arm assembly 14 (FIG. 1).

A large spirally wound torsion spring 55 is located in the gear housing chamber 22 immediately beneath the spindle gear 50 and in surrounding relation with the spindle shaft 51 to which it is attached at its inner end. The opposite or outer end of spring 55 is suitably anchored to the housing 20. In operation, spring 55 opposes rotational movement of the spindle shaft 51 in a door opening direction and thereby stores energy to provide the necessary force for reversely rotating the spindle shaft in a door closing direction. It will be appreciated that loading of spring 55 is brought about by the motor driven actuation of the drive train. In normal circumstances, the spring 55 is also pre-loaded to a preselected value productive of sufficient force to hold the door closed over the doorway 11 and to swing the door to its emergency open position upon release of the break-away stop assembly 15, as indicated in FIG. 1.

Figure 3:
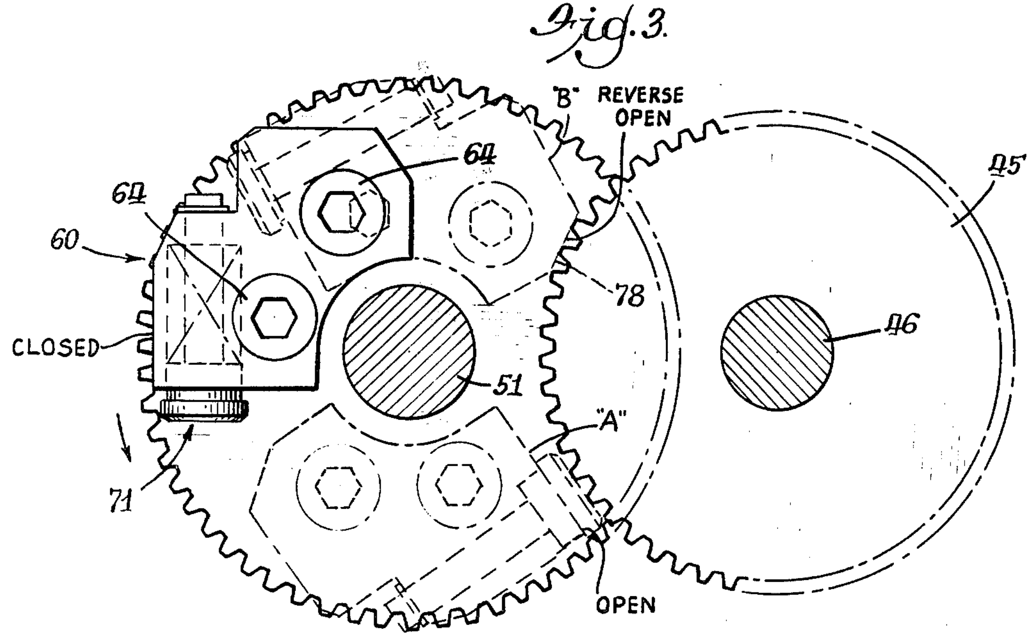
FIG. 3 is an enlarged plan view of a pair of gears with which the improved stop assembly of this invention is associated.
Figure 4:
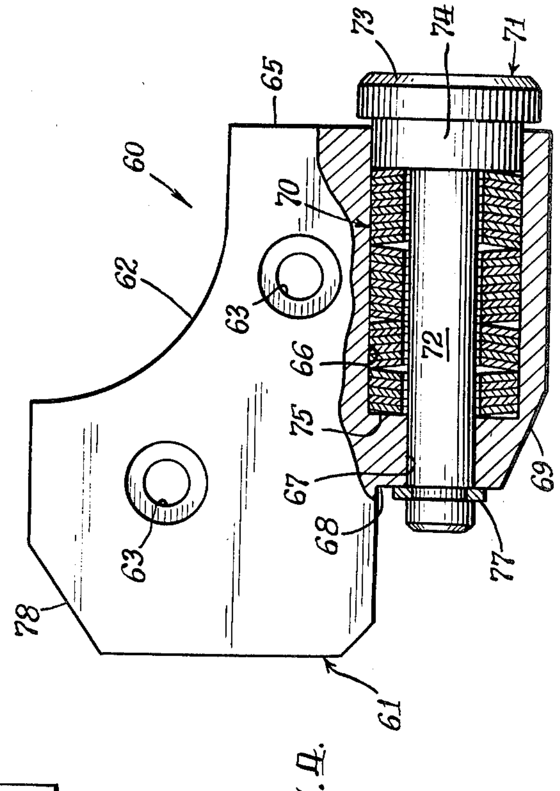
FIG. 4 is an enlarged plan view of the improved stop assembly with portions thereof broken away in section.

Turning now to the features of improved stop assembly 60 of this invention, specific references is made to FIGS. 2, 3, and 4 of the drawings, from which it will be recognized that assembly 60 is mounted within the gear housing 20 on the upper face of the large spindle gear 50 (see FIG. 2). It will be particularly appreciated that the structural aspects of the stop assembly 60 are such as to accommodate its positioning and operation within the confined space dictated by the vertical distance between the spindle gear 50 and the inside or bottom face of the cover 21 and within the radial dimension between the spindle shaft 51 and the sidewalls of the cast gear housing 20, on the upper side of the spindle gear 50 (see FIG. 3).

With particular reference to FIG. 4 of the drawings, assembly 60 comprises a rigid unitary metal mounting block 61 distinguished by a radial or semi-circular edge portion 62 which is operatively disposed adjacent to spindle shaft 51. Block 61 is provided with a pair of bored openings 63,63, appropriately spaced for receiving machine screws 64 (see FIG. 2) for fixing the block 61 rigidly to the upper face of the spindle gear 50. Opposite the curvilinear edge surface 62 of block 61 and formed inwardly of an end wall 65 thereof is a cylindrical spring chamber 66 communicating with a bored passageway 67 extending from the bottom of the chamber outwardly to a rear end wall 68 which parallels end wall 65 and is formed by a notch cutout in an intersecting outer edge 69 of the mounting block. Chamber 66 is respective of a plurality of frusto-conical disc springs providing a compact assembly indicated generally by numeral 70 in FIG. 4.

Extending co-axially through the open centers of the plural disc springs of the assembly 70 is a piston plunger 71 having a cylindrical piston rod portion 72 formed integrally with a co-axially aligned enlarged cylindrical head portion 73 at the outer end thereof. Head 73 has a cylindrical collar portion 74 immediately therebehind and of a diameter substantially co-extensive with the cylindrical diameter of the chamber 66. The collar portion 74 engages the outermost spring in the spring disc assembly 70 while the opposite end of such spring assembly abuts the bottom end wall 75 of the chamber 66.

The cylindrical piston rod 72 extends through opening 67 and beyond face 68 where it is surrounded by a retaining snap ring 77 adapted to fit into a slotted kerf formed adjacent the outer end of the piston rod 72. The outer head 73 of the plunger is operationally engageable with the bevel gear 45 as will appear presently, and is normally assembled with the disc springs under a slight compressive load so that the enlarged head portion 73 is spaced away from the outer end face 65 of the mounting block 61. It will be recognized that inward movement of the plunger against the disc spring assembly 70 serves to axially compress the same which in turn reactively opposes inward movement of the plunger 71. As will be amplified later herein, the particular arrangement of the disc springs serves to provide a regulatable spring reaction of high resistance to compression which affords an efficient and compact mechanical stop capable of withstanding the expected impact forces applied to the door operator mechanism. (See FIGS. 6 and 7).

OPERATION

Turning now to the operational aspects of stop assembly 60, specific reference is made to FIG. 3 of the drawings which illustrates the mounted position of assembly 60 on the upper face of spindle gear 50 outwardly of, but in engageable alignment with the adjacent bevel gear 45. As illustrated, the full line showing of the assembly 60 indicates its operational position relative to gear 45 when the door 10 is in its closed position over opening 11. During door-opening operation the spindle shaft 51 and the spindle gear 50 attached thereto rotate in a counterclockwise sense as viewed in FIG. 3, moving assembly 60 with gear 50 until the outer end of the plunger 71 engages the teeth of the bevel gear 45, at which position the door is fully opened. Further opening movement of the door as by wind impact, intentional tampering, or by a person accidentally leaning against the door, for instance, causes the plunger 71 to move inwardly of chamber 70 until head 73 engages end wall, 65, fully compressing the disc spring assembly 70. The stacked springs actively resist such loading and restrict the relative rotational movement of gears 45 and 50. This condition is indicated at "A" in FIG. 3. In the particular stacking arrangement for the disc springs, illustrated in FIG. 4, approximately 1½ degree movement of the spindle shaft 51 and gear 50 (permitted by the tooth fit of gears 49 and 50) produces, approximately 1,700 pounds of reactive resistance to the inward movement of the plunger (see FIG. 6). This yieldable resistive force is applied to the periphery of the bevel gear 45 and actively prevents application of the impact force to the remainder of the drive train.

Figure 6:
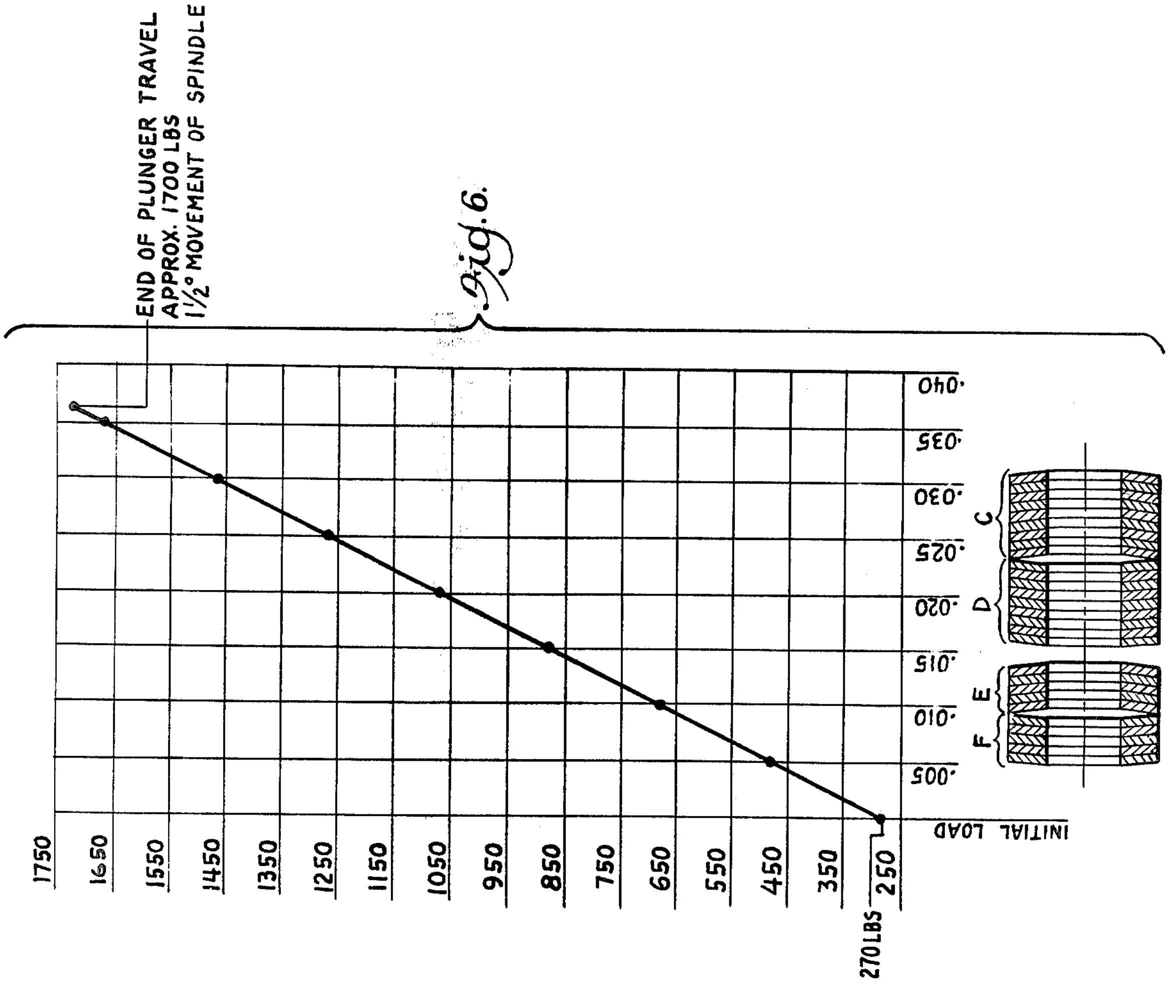
FIG. 6 is a graphic illustration of the operational characteristics for a preferred disc-spring arrangement for the stop assembly.

The particular load resistance values produced with the disc spring arrangement illustrated if FIG. 4 is graphically set forth in FIG. 6 of the drawings, from which it will be understood that the spring disc assembly 70 illustrated comprises two groupings "C" and "D" of nine parallel disc springs, oriented in opposing reverse or "series" relationship with respect to one another. In addition, two smaller groups "E" and "F" of five parallel disc springs, each are similarly disposed in opposition or "series" to one another, with group "E" also being in "series" alignment with group "D". With this particular series parallel stacking the spring steel disc springs, having an outer diameter of 0.492 inches; an inner diameter of 0.244 inches and a thickness of 0.0275, inches the load values indicated on the graph of FIG. 6 are obtained. The disc spring assembly 70 is also initially compressed or pre-loaded to provide substantially 270 pounds of thrust, as indicated, with full movement of the spindle shaft of substantial 1½ degrees producing substantially 0.037 inches of plunger movement. As previously mentioned, lesser plunger movement creates various lower load resistance values.

Figure 7:
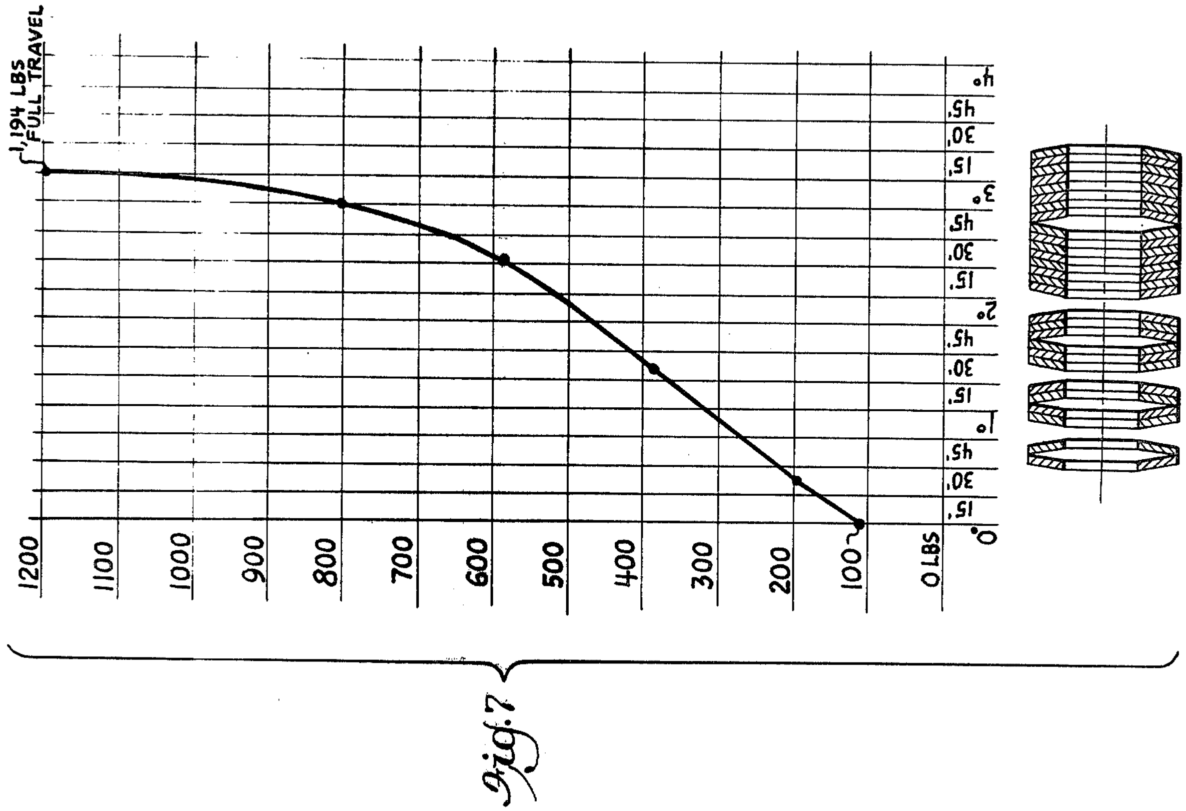
FIG. 7 is another graphic illustration of the operational characteristics for a modified disc-spring arrangement for the stop assembly.

In FIG. 7 an alternative stacking of the disc spring assembly 70 is illustrated comprising twenty-eight disc springs arranged in parallel groups of eight, three, two and one; the adjacent groups or sets of springs being in series relationship as shown at the bottom of FIG. 7. With this alternate arrangement for the spring discs of assembly 70, three degrees of spindle movement produces a reactive spring force of substantially 1,194 pounds at full travel of the piston, as shown.

With the described arrangement of the stop assembly 60, moving with the spindle gear 50, there is direct assurance of the required stop function in relation to predetermined door movements. Further, by adapting the disc spring teachings to a stop of the character described, high impact protection of the drive train is assured while achieving the compactness necessary for concealing the stop within the drive train housing, rendering the same tamper-proof.

As previously mentioned, one of the requirements for automatic doors, particularly of the inwardly opening variety as illustrated in FIG. 1 of the drawings, is that the same be capable of opening outwardly under emergency exit conditions. To this end, a break-away stop assembly 15 of the order illustrated in FIG. 1 and is employed.

As there shown, a pivotal arm 85 is mounted over the door 10 in the header of the door frame adjacent the outer or non-hinged edge of the door. The stop-finger 85 is characterized by a pair of depending finger portions 86 and 87 at its opposite ends, the former of which is normally held in a interfering position to movement of the door 10 by a C-shaped spring 88, biased between a stationary pin 89 affixed to the door header and a secondary pin 90 projecting from one face of the stop arm 85. In this arrangement, spring 88 serves to depress the finger portion 86 into its normal interfering position with the door, preventing its movement in an outward direction. Because of the forgivable or resilient nature of spring 88, when the door 10 is engaged with stop-finger 86, if sufficient force is applied to the door, spring 88 is biased upwardly about the pins 89 and 90, permitting the arm 85 to pivot upwardly about its mounting pivot 91 until the finger 86 therein reaches a non-interfering position over the upper edge of the door. In this condition, spring 88 serves to hold the arm 85 in its raised position, having passed through a dead center condition, once pin 90 on the stop arm is elevated above the stationary pin 89 fixed to the header. With the breakaway stop out of the way, the door 10 is then free to move outwardly to an emergency opening position, as indicated by the dotted lines in FIG. 1. This opening takes place in response to the pre-loaded forces stored in the torsion spring 55, which, it will be recalled, normally operates to return the door 10 to its closed position across opening 11 (i.e. against the stop-finger 86). During such emergency opening movement of the door under the force of spring 55, the gear train is motivated in a reverse direction to effectively drive the motor 23 in a reverse direction under reverse rotation of its drive shaft 25. Under such reverse driving conditions, the drive motor acts as a generator which, in conjunction with a resistor in circuit therewith, provides a dynamic brake to slow outward swinging movement of the door.

As shown in FIG. 3 of the drawings, when the door 10 is fully opened to its reversed emergency exit position, stop assembly 60 is positioned as indicated at "B" in that Figure. In such position a champhered surface 78 on the mounting block 61 is abutted against the bevel gear 45 to act as a positive stop, limiting opening movement of the door in a reverse direction to a position of substantially 90° with respect to the wall 12.

From the foregoing it is submitted that those skilled in the art to which the described invention pertains, will readily recognize and appreciate its advantages and advancement over prior known stop assemblies. Further, while the concepts and teachings of this invention have been set forth in conjunction with an illustrated preferred embodiment thereof, representing the best mode presently known for enabling those skilled in the art to make and practice the same, it is fully contemplated that the herein disclosed and illustrated structures are susceptible to various changes, modifications and substitutions of equivalents without departing from the concepts and teachings of this invention.

The embodiments of the invention in which an exclusive property or privilege is claimed are defined as follows:

1. In an electro-mechanical, automatic door operator having a power actuated drive train embodying a plurality of rotatable gears enclosed within a housing for rotatably driving a door spindle shaft operatively connected with a door for effecting opening and closing movements thereof, the combination comprising: a pair of non-intermeshing gears of the drive train, adjacently disposed on parallel shafts and lying in parallel planes so as to partially over-lap one another, one of which gears is mounted on the door spindle shaft; and a compact stop assembly movable with said one gear and mounted thereon to lie within the circumferential confines of said one gear and in interfering alignment with the periphery of the other gear of said pair; said stop assembly being operable to abut the toothed periphery of said other gear in response to rotational movement of said one gear whereby to limit relative rotation of said pair of gears for the purpose of stopping the door at predetermined open positions.

2. The combination of claim 1, wherein said stop assembly comprises a spring loaded plunger carried by a housing fixed to and extending outwardly of one face of said one gear and having an outer end thereon abuttingly engagable with the toothed periphery of said other gear, said plunger being resiliently supported and operable to cushion its impact with said periphery and resiliently opposed movement of the door beyond its normal open position.

3. The combination of claim 1 wherein said stop assembly is operable to provide high impact resistance to door movement beyond its normal open position.

4. The combination of claim 1, wherein said stop assembly comprises a spring loaded plunger movable in an arcuate path toward and away from the periphery of said other gear in response to partial rotation of said one gear; the outer end of said plunger being engageable with the periphery of said other gear in resistance to predetermined rotational movement of said one gear and spindle shaft, determinative of the normal open position for the door.

5. The combination of the claim 4 wherein said plunger is mounted for movement co-axially of a spring chamber formed in a unitary mounting block fixed to one face of said one gear for movement therewith, and an assembly of frusto-conical disc springs confined in said chamber and operatively arranged to resiliently oppose movement of said plunger theretoward.

6. The combination of claim 5 in which said disc springs are sized and arranged in series-parallel groupings to provide substantially 1,700 pounds of resistive force in response to substantially 0.037 inches of plunger movement theretoward.

7. The combination of claim 5, in which said unitary mounting block is formed with an end wall abuttingly engagable with the periphery of said other gear whereby to limit movement of said door in a reverse opening direction.

* * * * *

UNITED STATES PATENT OFFICE
CERTIFICATE OF CORRECTION

Patent No. 4,185,512 Dated January 29, 1980

Inventor(s) Gerhard B. Sommer

It is certified that error appears in the above-identified patent and that said Letters Patent are hereby corrected as shown below:

Column 5, line 5, "respective" should be --receptive--;

Column 8, line 29, "resistance" should be --response--.

Signed and Sealed this

*Tenth* Day of *June 1980*

[SEAL]

*Attest:*

SIDNEY A. DIAMOND

*Attesting Officer* *Commissioner of Patents and Trademarks*